US011315018B2

(12) United States Patent
Molchanov et al.

(10) Patent No.: US 11,315,018 B2
(45) Date of Patent: Apr. 26, 2022

(54) SYSTEMS AND METHODS FOR PRUNING NEURAL NETWORKS FOR RESOURCE EFFICIENT INFERENCE

(71) Applicant: NVIDIA Corporation, Santa Clara, CA (US)

(72) Inventors: Pavlo Molchanov, San Jose, CA (US); Stephen Walter Tyree, St. Louis, MO (US); Tero Tapani Karras, Helsinki (FI); Timo Oskari Aila, Tuusula (FI); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 882 days.

(21) Appl. No.: 15/786,406

(22) Filed: Oct. 17, 2017

(65) Prior Publication Data

US 2018/0114114 A1    Apr. 26, 2018

Related U.S. Application Data

(60) Provisional application No. 62/411,488, filed on Oct. 21, 2016.

(51) Int. Cl.
*G06N 3/08* (2006.01)
*G06N 3/04* (2006.01)

(52) U.S. Cl.
CPC ........... *G06N 3/082* (2013.01); *G06N 3/0454* (2013.01); *G06N 3/084* (2013.01)

(58) Field of Classification Search
CPC ....... G06N 3/082; G06N 3/0454; G06N 3/084
See application file for complete search history.

(56) References Cited

U.S. PATENT DOCUMENTS 5,371,809 A    12/1994  Desieno
5,502,688 A     3/1996  Recchione et al.
(Continued)

FOREIGN PATENT DOCUMENTS

CN    102968663 A    3/2013
CN    104504441 A    4/2015
(Continued)

OTHER PUBLICATIONS

Li, H., Kadav, A., Durdanovic, I., Samet, H. and Graf, H.P., 2016. Pruning filters for efficient convnets. arXiv preprint arXiv: 1608.08710. (Year: 2016).*
(Continued)

*Primary Examiner* — Alexey Shmatov
*Assistant Examiner* — Casey R. Garner
(74) *Attorney, Agent, or Firm* — Leydig, Voit & Mayer, Ltd.

(57) ABSTRACT

A method, computer readable medium, and system are disclosed for neural network pruning. The method includes the steps of receiving first-order gradients of a cost function relative to layer parameters for a trained neural network and computing a pruning criterion for each layer parameter based on the first-order gradient corresponding to the layer parameter, where the pruning criterion indicates an importance of each neuron that is included in the trained neural network and is associated with the layer parameter. The method includes the additional steps of identifying at least one neuron having a lowest importance and removing the at least one neuron from the trained neural network to produce a pruned neural network.

21 Claims, 11 Drawing Sheets

(56) References Cited

U.S. PATENT DOCUMENTS

| | | | |
|---|---|---|---|
| 5,636,326 | A | 6/1997 | Stork et al. |
| 5,719,692 | A | 2/1998 | Cohen |
| 5,787,408 | A | 7/1998 | Deangelis |
| 6,311,172 | B1 | 10/2001 | Tresp et al. |
| 6,456,991 | B1 | 9/2002 | Srinivasa et al. |
| 6,601,053 | B1 | 7/2003 | Schaffer et al. |
| 7,472,096 | B2 | 12/2008 | Burges et al. |
| 8,095,483 | B2 | 1/2012 | Weston et al. |
| 8,700,552 | B2 | 4/2014 | Yu et al. |
| 9,111,375 | B2 | 8/2015 | Meier |
| 9,613,316 | B2 | 4/2017 | Harik |
| 9,633,306 | B2 | 4/2017 | Liu et al. |
| 9,721,204 | B2 | 8/2017 | Campos et al. |
| 2016/0321784 | A1* | 11/2016 | Annapureddy ........ G06N 3/082 |
| 2016/0350655 | A1 | 12/2016 | Weiss et al. |
| 2016/0358070 | A1 | 12/2016 | Brothers et al. |
| 2017/0024641 | A1* | 1/2017 | Wierzynski .......... G06N 3/0454 |
| 2017/0148444 | A1 | 5/2017 | Bocklet et al. |
| 2017/0337472 | A1* | 11/2017 | Durdanovic ......... G06N 3/0454 |
| 2018/0046914 | A1* | 2/2018 | Li ........................ G06N 3/0445 |

FOREIGN PATENT DOCUMENTS

| | | |
|---|---|---|
| CN | 106054893 A | 10/2016 |
| CN | 106227851 A | 12/2016 |
| CN | 106779075 A | 5/2017 |
| EP | 1892921 B1 | 2/2016 |

OTHER PUBLICATIONS

Augasta, M. Gethsiyal, and T. Kathirvalavakumar. "A novel pruning algorithm for optimizing feedforward neural network of classification problems." Neural processing letters 34, No. 3 (2011): 241. (Year: 2011).*

Han, Song, Jeff Pool, John Tran, and William Dally. "Learning both weights and connections for efficient neural network." In Advances in neural information processing systems, pp. 1135-1143. 2015. (Year: 2015).*

Lecun et al., "Efficient BackProp," Springer Berlin Heidelberg, Berlin, Heidelberg, 1998, pp. 9-50.

Bekas et al., "An estimator for the diagonal of a matrix," Applied numerical mathematics, vol. 57, No. 11, 2007, pp. 1214-1229.

Dauphin et al., Equilibrated adaptive learning rates for non-convex optimization, Advances in Neural Information Processing Systems, 2015, pp. 1504-1512.

Anwar et al.,"Structured pruning of deep convolutional neural networks," ACM Journal on Emerging Technologies in Computing Systems (JETC), vol. 13, No. 3, 2017, pp. 1-11.

Han et al., "Learning both weights and connections for efficient neural network," Advances in Neural Information Processing Systems, 2015, pp. 1-9.

Kim et al. "Compression of deep convolutional neural networks for fast and low power mobile applications," arXiv preprint arXiv:1511.06530, 2015, pp. 1-16.

Lecun et al., "Optimal brain damage," In Advances in Neural Information Processing Systems (NIPS), 1990, pp. 1-8.

Hassibi et al., "Optimal brain surgeon and general network pruning." Neural Networks, IEEE International Conference, 1993, pp. 1-7.

Karnin, E. D., "A Simple Procedure for Pruning Back-Propagation Trained Neural Networks," IEEE Transactions on Neural Networks, vol. 1, No. 2, Jun. 1990, pp. 239-242.

Bondarenko et al., "Artificial Neural Network Generalization and Simplification via Pruning," Information Technology and Management Science, 2014, pp. 1-6.

Leahy et al., "Structural optimisation and input selection of an artificial neural network for river level prediction," Journal of Hydrology, 2008, vol. 355, pp. 192-201.

Brent, R., "Fast training algorithms for multilayer neural nets," IEEE Transactions on Neural Networks, vol. 2, No. 3, 1991, pp. 346-354.

Liu et al., "Pruning Deep Neural Networks by Optimal Brain Damage," Fifteenth Annual Conference of the International Speech Communication Association, 2014, pp. 1-4.

Augasta et al., "Pruning algorithms of neural networks—a comparative study," Central European Journal of Computer Science, vol. 3, No. 3, 2003, pp. 105-115.

Suzuki et al., "A Simple Neural Network Pruning Algorithm with Application to Filter Synthesis," Neural Processing Letters, vol. 13, 2001, pp. 43-53.

Laudani et al. "On Training Efficiency and Computational Costs of a Feed Forward Neural Network: A Review," Computational Intelligence and Neuroscience, vol. 2015, 2015, pp. 1-13.

Hu et al., "Network Trimming: A data-driven neuron pruning approach towards efficient deep architectures," arXiv preprint arXiv:1607.03250, 2016, pp. 1-9.

Luo et al., "Thinet: A filter level pruning method for deep neural network compression," arXiv preprint arXiv:1707.06342, 2017, pp. 1-9.

\* cited by examiner

SYSTEMS AND METHODS FOR PRUNING NEURAL NETWORKS FOR RESOURCE EFFICIENT INFERENCE

CLAIM OF PRIORITY

This application claims the benefit of U.S. Provisional Application No. 62/411,488 titled "Pruning Convolutional Kernels in Deep Neural Networks with First Order Taylor Approximation of Neuron's Contribution," filed Oct. 21, 2016, the entire contents of which is incorporated herein by reference.

FIELD OF THE INVENTION

The present invention relates to neural networks, and more particularly to pruning neural networks.

BACKGROUND

Convolutional neural networks (CNN) are used extensively in computer vision applications, including object classification and localization, pedestrian and car detection, and video classification. Many problems like these focus on specialized domains for which there are only small amounts of carefully curated training data. In these cases, accuracy may be improved by fine-tuning an existing deep network previously trained on a much larger labeled vision dataset. While transfer learning of this form supports state of the art accuracy, inference is expensive due to the time, power, and memory demanded by the heavyweight architecture of the fine-tuned network. Thus, there is a need for addressing these issues and/or other issues associated with the prior art.

SUMMARY

A method, computer readable medium, and system are disclosed for neural network pruning. The method includes the steps of receiving first-order gradients of a cost function relative to layer parameters for a trained neural network and computing a pruning criterion for each layer parameter based on the first-order gradient corresponding to the layer parameter, where the pruning criterion indicates an importance of each neuron that is included in the trained neural network and is associated with the layer parameter. The method includes the additional steps of identifying at least one neuron having a lowest importance and removing the at least one neuron from the trained neural network to produce a pruned neural network.

DETAILED DESCRIPTION

While modern deep CNNs are composed of a variety of layer types, runtime during prediction is dominated by the evaluation of convolutional layers. With the goal of speeding up inference, entire feature maps may be pruned so the resulting networks may be run efficiently, even on embedded devices. In one embodiment, greedy criteria-based pruning is interleaved with fine-tuning, resulting in a computationally efficient procedure that maintains good generalization in the pruned network. A pruning criterion is computed to evaluate the importance of neurons in the network and at least one "least important" neuron is removed to prune the network. The "least important" neuron is the neuron providing the smallest contribution to the final prediction.

Figure 1A:
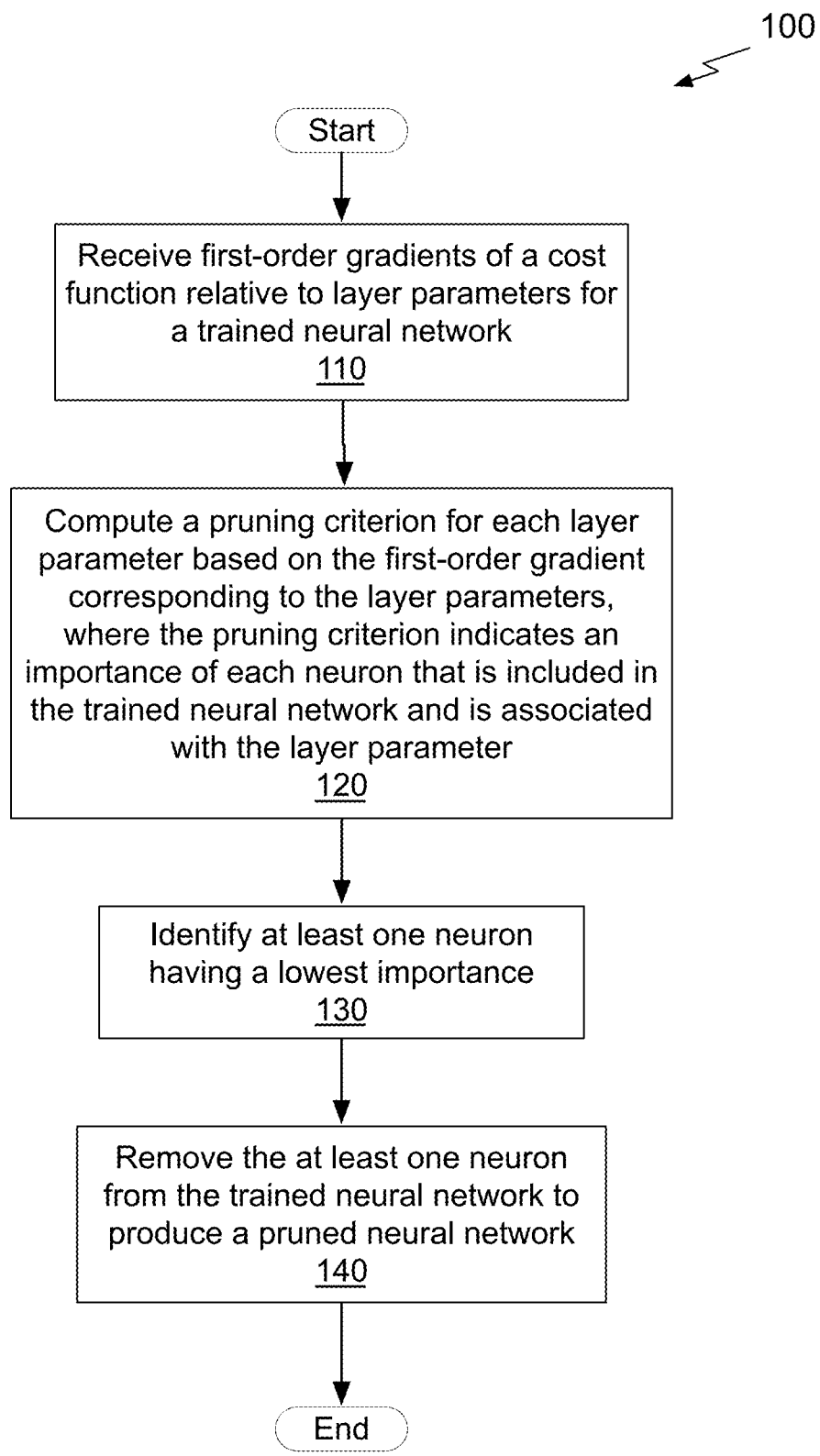
FIG. 1A illustrates a flowchart of a method for neural network pruning, in accordance with one embodiment.

FIG. 1A illustrates a flowchart 100 of a method for neural network pruning, in accordance with one embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), neural network, or any processor capable of implementing a neural network. Furthermore, persons of ordinary skill in the art will understand that any system that performs method 100 is within the scope and spirit of embodiments of the present invention.

At step 110, first-order gradients of a cost function with respect to layer parameters are received for a trained neural network. A cost value is the value of the cost function at the current state of the network that indicates the accuracy of the neural network. In one embodiment, the layer input parameter is a weight or activation. Note that a layer input parameter for one layer in a neural network is output by a previous layer, so that a "layer parameter" refers to either a layer input parameter or a layer output parameter. In one embodiment, the trained neural network was previously trained on a large dataset and the first-order gradients are generated during a transfer learning training process with a smaller, more specific dataset.

At step 120, a pruning criterion is computed for each layer parameter based on the first-order gradient corresponding to the layer parameter, where the pruning criterion indicates an importance of each neuron that is included in the trained neural network and is associated with the layer parameter. In one embodiment, a first pruning criterion is based on a first-order Taylor expansion including the first-order gradient (i.e., first derivative) that approximates a change in the cost function induced by pruning network parameters. The change in the cost value indicates the accuracy of the neural network with and without a layer input parameter, and the change may be minimized. In another embodiment, a second criterion is based on a sum of squares including the first-order gradient of the cost function relative to the layer input parameter.

At step 130, at least one neuron having a lowest importance is identified. In one embodiment, the at least one neuron corresponds to a feature map in a convolutional layer. In one embodiment, the at least one neuron includes neurons having importances below a threshold value. In one embodiment, the at least one neuron comprises a predetermined percentage of all of the neurons in the trained neural network.

At step 140, the at least one neuron is removed from the trained neural network to produce a pruned neural network. In one embodiment, a neuron may be removed by setting a layer parameter to zero. In one embodiment, a neuron may be removed by setting a corresponding pruning gate to zero. In one embodiment, greedy criteria-based pruning is interleaved with fine-tuning to iteratively remove neurons from the trained neural network.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Ideally, pruning considers removal of each neuron individually by computing the cost function of the neural network with and without each neuron, repeating the process each time a neuron is removed from the neural network. While, ideal pruning is not practical computationally, ideal pruning may be used as a comparison to evaluate the performance of various pruning techniques.

For a convolutional neural network (CNN) a set of image feature maps is denoted by $z_l \in R^{H_l \times W_l \times C_l}$ with dimensionality $H_l \times W_l$ and $C_l$ individual maps (or channels). The feature maps can either be the input to the neural network, $z_0$, or the output from a convolutional layer $z_l$ with $l \in [1, 2, \ldots, L]$. Individual feature maps are denoted $z_l^{(k)}$ for $k \in [1, 2, \ldots, C_l]$. A convolutional layer l applies the convolution operation (*) to a set of input feature maps $z_{l-1}$ with kernels parameterized by $w_l^{(k)} \in R^{C_{l-1} \times p \times p}$:

$$z_l^{(k)} = g_l^{(k)} R(z_{l-1} * w_l^{(k)} + b_l^{(k)}), \quad (1)$$

where $z_l^{(k)} \in R^{H_l \times W_l}$ is the result of convolving each of $C_{l-1}$ kernels of size p×p with its respective feature map and adding bias $b_l^{(k)}$. The nonlinear activation R is assumed to be the rectified linear unit. Although the techniques are described in the context of two-dimensional (2D) convolutions, the techniques may also be applied to three-dimensional (3D) convolutions.

A training dataset is used during pruning to remove neurons from a previously trained neural network. The training dataset $D=\{X=\{x_0, x_1, \ldots, x_N\}, Y=\{y_0, y_1, \ldots, y_N\}\}$, where x and y represent an input and target output, respectively. The neural network's parameters $W=\{(w_1^1, b_1^1), (w_1^2, b_1^2), \ldots (w_L^{C_l}, b_L^{C_l})\}$ are optimized to minimize a cost value C(W). In one embodiment, a parameter (w,b) $\in W$ may represent an individual weight, a convolutional kernel, or an entire set of kernels that compute a feature map. The most common choice for a cost function C(•) is a negative log-likelihood function. A cost function is selected independently of pruning and depends only on the task to be solved by the original neural network. In the case of transfer learning, a large trained neural network is used that is initialized with parameters $W_0$ produced during training on a related, but distinct dataset.

During pruning, a subset of parameters is refined. During pruning the accuracy of the adapted neural network, C(W')≈C(W), is preserved. The accuracy corresponds to a combinatorial optimization:

$$\min_{W'} |C(W') - C(W)| \text{ s.t. } \|W'\|_0 \le B, \quad (2)$$

where the $l_0$ norm in $\|W'\|_0$ bounds the number of non-zero parameters B in W'. Intuitively, if W'=W, the global minimum of an error function $\Omega$ is reached. However, $\|W'\|_0$ will also be at a maximum. The error function $\Omega$ measures a change of the cost function after pruning, where $\Omega(C(W')-C(W))$ is minimized subject to $\|W'\|_0$. In one embodiment, the error function is an absolute difference or Euclidean distance.

Finding a good subset of parameters while maintaining a cost value as close as possible to the original (i.e., minimizing the error function) is a combinatorial problem requiring $2^{|W|}$ evaluations of the cost function for a selected subset of data. Using embedded computing systems available today, it is not possible to achieve optimal pruning in real-time by optimizing the combinatorial problem exactly for neural networks of a reasonable size. Therefore, a criteria-based pruning technique is preferred, starting with a full set of the parameters W and pruning as a backward filter by iteratively identifying and removing at least one least important layer parameter to satisfy the $l_0$ bound on W'. By removing parameters at each iteration, the $l_0$ norm of W' may be minimized. Removing one layer parameter each iteration guarantees minimization of the difference between the original neural network model and the pruned neural network model. Once a parameter is removed, the criteria are reevaluated as parameters have cross-dependencies. The most sensitive aspect in backward filter based pruning of a neural network is the estimation of layer parameter importance.

Figure 1B:
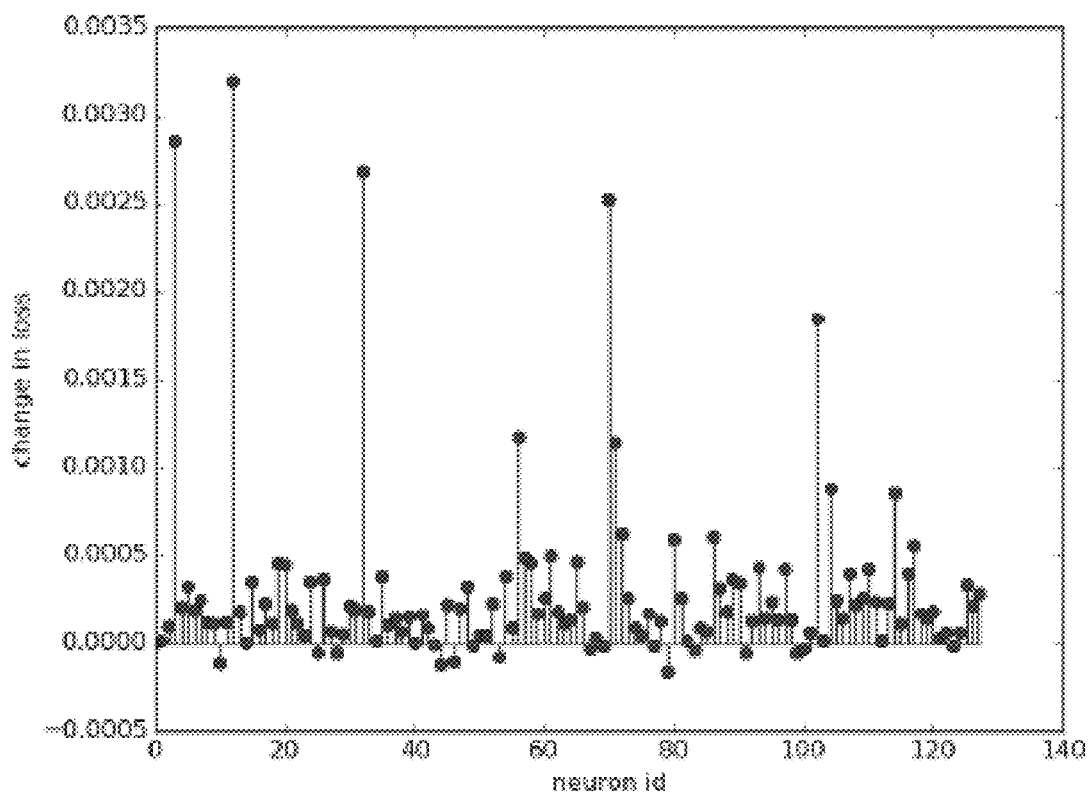
FIGS. 1B and 1C illustrate graphs of a change in loss function as a resulting from removing a specific neuron, in accordance with one embodiment.

FIG. 1B illustrates a graph of a change in loss function resulting from removing a specific neuron for a third layer of a neural network, in accordance with one embodiment. The contribution of each neuron to the change in loss ranges from slightly negative to positive. So there are some neurons that, when removed will decrease the cost function. As shown in FIG. 1B, neurons whose removal results in a reduction of loss are below the x-axis. Many neurons may have a contribution that is close to zero and may be considered for removal. A small number of neurons produce a large increase in loss when removed.

Figure 1C:
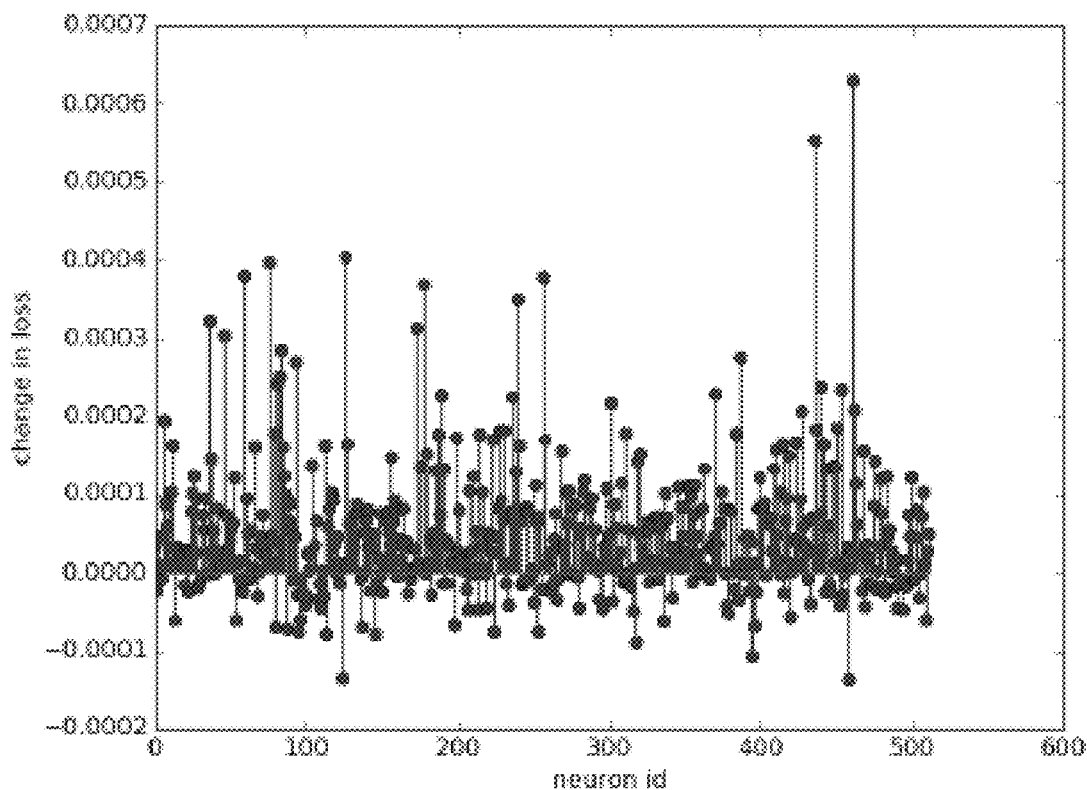

FIG. 1C illustrates another graph of a change in loss function resulting from removing a specific neuron for an eighth layer of a neural network, in accordance with one embodiment. Similar with the graph shown in FIG. 1B, some neurons have a negative contribution when removed, most neurons have a contribution close to zero, and a small number of neurons produce a large increase in loss when removed. In sum, each layer of the neural network typically has a small number of neurons, which, when removed result in significant increase of loss. Each layer also typically has less valuable neuron. Therefore, pruning should scale across all layers rather than focus on particular layers.

Figure 1D:
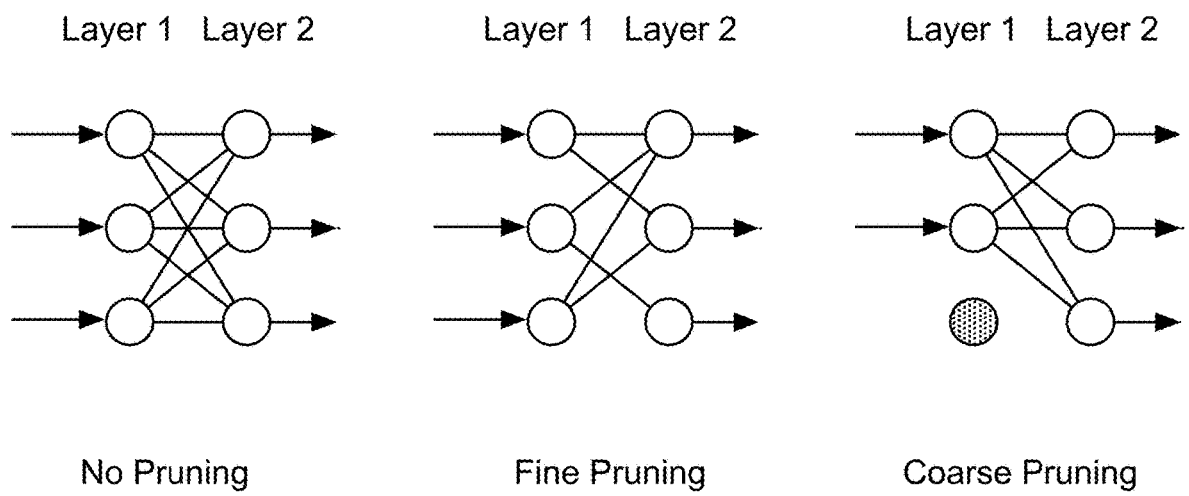
FIG. 1D illustrates a conceptual diagram of removing neurons from a neural network, in accordance with one embodiment.

FIG. 1D illustrates a conceptual diagram of removing neurons from a neural network, in accordance with one embodiment. Neurons (or feature maps) for a particular layer are represented as circles and connections between the neurons are each associated with a weight. After fine-pruning, connections between the neurons (or feature maps)

are removed. For example, connections corresponding to small weight values may be removed. However, to accelerate processing special circuitry may be required that can redistribute processing when the weights for a layer are sparse. In coarse pruning, entire neurons (or feature maps) are removed. As shown in FIG. 1D, the patterned neuron is removed during coarse pruning. When a neuron is removed, all connections to and from the neuron are removed.

To avoid solving the combinatorial problem requiring $2^{|W|}$ evaluations of the cost function, pruning may be represented as an optimization problem of trying to find W' with a bounded number of non-zero elements that minimize $|\Delta C (h_i)|=|C(W')-C(W)|$. A Taylor expansion may be used to solve the optimization problem. Change in the loss function may be approximated for removal of a particular parameter. Let $h_i$ be the output produced from parameter i. In the case of feature maps, $h=\{z_0^{(1)}, z_0^{(2)}, \ldots, z_L^{(C_l)}\}$. For notational convenience, the cost function is considered to be equally dependent on parameters and outputs computed from parameters: $C(h_i)=C((w,b)_i)$. Assuming independence of parameters:

$$|\Delta C(h_i)|=|C(D,h_i=0)-C(D,h_i)|, \quad (3)$$

where $C(D, h_i=0)$ is a cost value when the layer parameter $h_i$ is pruned, and $C(D, h_i)$ is the cost value when the layer parameter $h_i$ is not pruned. While parameters are in reality interdependent, an assumption of independence is already made at each gradient computation step during first-order training techniques.

To approximate $\Delta C(h_i)$, the first-degree Taylor polynomial is used. For a function $f(x)$, the Taylor expansion at point x=a is:

$$f(x) = \sum_{p=0}^{P} \frac{f^{(p)}(a)}{p!}(x-a)^p + R_p(x), \quad (4)$$

where $f^{(p)}(a)$ is the p-th derivative of $f$ evaluated at point a, and $R_p(x)$ is the p-th order remainder. Approximating $C(D, h_i=0)$ with a first-order Taylor polynomial near $h_i=0$ for the training dataset D produces:

$$C(D, h_i = 0) = C(D, h_i) - \frac{\delta C}{\delta h_i} h_i + R_1(h_i = 0), \quad (5)$$

The remainder $R_1(h_i=0)$ can be calculated through the Lagrange form:

$$R_1(h_i = 0) = \frac{\delta^2 C}{\delta(h_i^2 - \xi)} \frac{h_i^2}{2}, \quad (6)$$

where $\xi$ is a real number between 0 and $h_i$. The first criterion that is used for pruning is an approximation of $C(D, h_i=0)$, where the remainder $R_1(h_i=0)$ is ignored (i.e., set to zero), resulting in the calculation:

$$C(D, h_i = 0) = C(D, h_i) - \frac{\delta C}{\delta h_i} h_i. \quad (7)$$

By substituting Equation (5) into equation (3) and ignoring the remainder, the difference $\Delta C(h_i)$ between the cost value for removing a particular layer parameter from a neural network can be minimized. The approximation is used to compute the first criterion $\Theta_{TE}$:

$$\Theta_{TE}(h_i) = |\Delta C(h_i)| = \quad (8)$$

$$|C(D, h_i = 0) - C(D, h_i)| = \left|C(D, h_i) - \frac{\delta C}{\delta h_i}h_i - C(D, h_i)\right| = \left|\frac{\delta C}{\delta h_i}h_i\right|.$$

Importantly, the first-order gradient $$\frac{\delta C}{\delta h_i}$$

is a first derivative that is computed for each layer parameter in the chain rule for back-propagation during training and can be stored for use in the first criterion computation. The first criterion prunes parameters that have an almost flat first-order gradient of the cost function w.r.t. the feature map $h_i$. The product of the layer parameter $h_i$ and the first-order gradient of the cost function C w.r.t. the layer parameter $h_i$. $\Theta_{TE}: R^{H_l \times W_l \times C_l} \to R^+$ is computed for a multi-variate output, such as a feature map, by $$\Theta_{TE} z_l^{(k)} = \left|\frac{1}{M}\sum_m \frac{\delta C}{\delta z_{l,m}^{(k)}} z_{l,m}^{(k)}\right|, \quad (9)$$

where M is a length of a vectorized feature map. For a minibatch with T>1 examples, the first criterion is computed for each example separately and averaged over T. A scale of the first criteria values varies with the depth, in terms of layers within the network. Therefore, a layer-wise $l_2$—normalization is computed to rescale the first criterion across the layers:

$$\hat{\Theta}(z_l^{(k)}) = \frac{\hat{\Theta}(z_l^{(k)})}{\sqrt{\sum_j (\hat{\Theta}(z_l^{(k)}))^2}}. \quad (10)$$

Scaling a criterion across layers is very important for pruning. If the criterion is not properly scaled, then a hand-tuned multiplier would need to be selected for each layer. Without normalization, a conventional weight magnitude criterion tends to rank feature maps from the first layers more important than last layers; a conventional activation criterion ranks middle layers more important; and the first criterion technique ranks first layers higher. After $l_2$ normalization, each layer has some feature maps that are highly important and others that are unimportant.

Conventional techniques for pruning that rely on using a Taylor expansion, use a second-order Taylor polynomial instead of a first-order Taylor polynomial. The second order expansion includes the first-order gradient and a second-order gradient:

$$\Delta C(h_i) = \frac{\delta C}{\delta h_i} + 0.5\frac{\delta^2 C}{\delta h_i^2} + R_2(h_i = 0). \quad (11)$$

Additionally, treatment of the first-order term of the Taylor expansion, $$y = \frac{\delta C}{\delta h} h$$

for the cost function C and the hidden layer parameter h as shown in Equation 8 is different compared with the conventional pruning techniques. After sufficient training epochs, the first-order gradient term tends to zero:

$$\frac{\delta C}{\delta C} \to 0$$

and $E(y)=0$. At face value, y offers little useful information. Consequently, conventional pruning techniques regard y as equal to zero and instead focus on the second-order term that includes the second-order gradient. Specifically, the conventional pruning techniques assume y=0 and the remainder $R_2(h_i=0)$ is also zero, resulting in a change in the cost function:

$$\Delta C(h_i) = 0.5 \frac{\delta^2 C}{\delta h_i^2}. \quad (12)$$

Importantly, the variance of y is non-zero and correlates with the stability of the local function w.r.t. the layer parameter h. The absolute value of the first-order term, |y| indicates the absolute change in the cost induced by pruning and is used to compute the first and second criteria, rather than being assumed to be zero (as in Equation 12). It is assumed that samples come from an independent and identical distribution $E(|y|)=\sigma\sqrt{2}/\sqrt{\pi}$, where σ is the standard deviation of y, known as the expected value of the half-normal distribution. So, while y tends to zero, the expectation of |y| is proportional to the variance of y, a value that is empirically more informative as a pruning criterion. As an additional benefit, computation of the second-order Taylor expansion term, or a simplification (e.g., diagonal of the Hessian matrix), is avoided. Computation of the Hessian matrix, either partially or completely, increases memory consumption and the computation requirements more than computing either the first or second criterion.

Figure 2A:
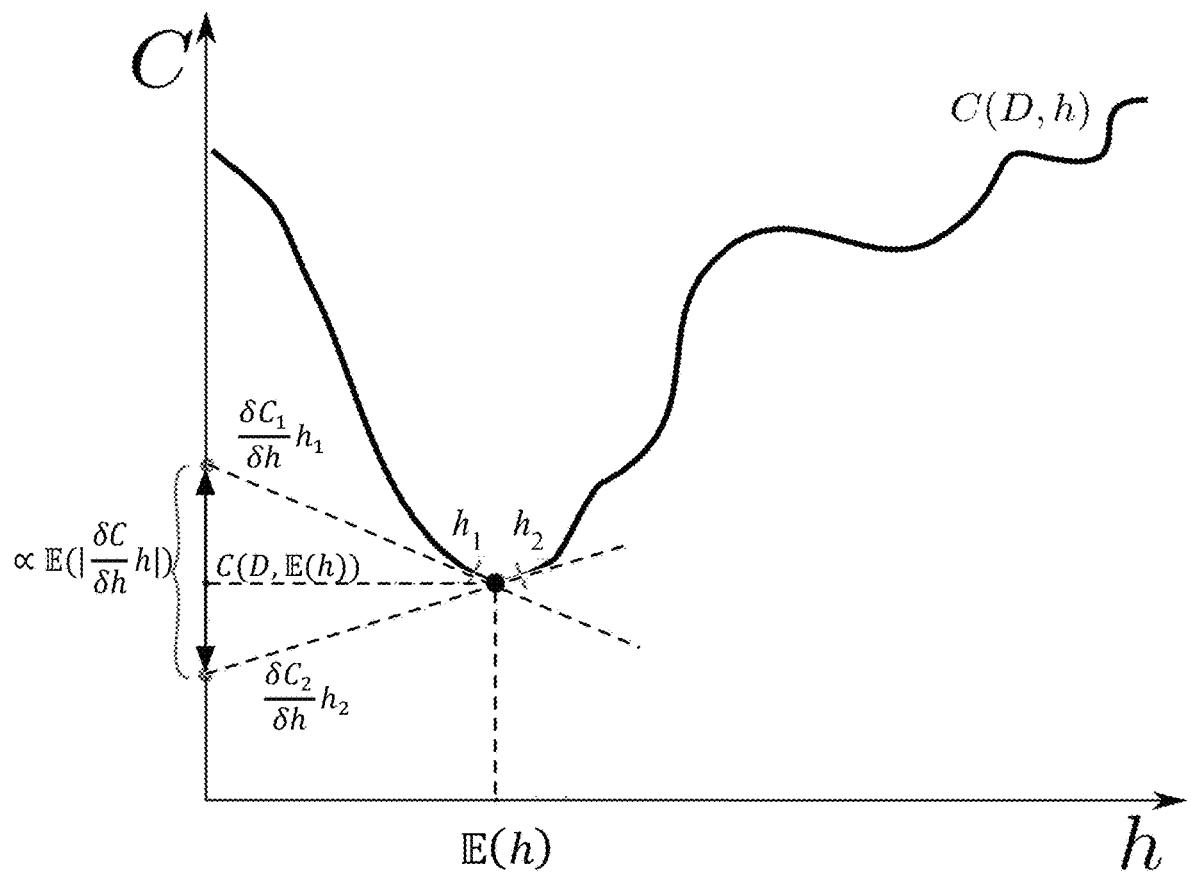
FIG. 2A illustrates a graph of the cost function C and the parameters h for the training dataset D, in accordance with one embodiment.

FIG. 2A illustrates a graph of the cost function C and the parameters h for the training dataset D, in accordance with one embodiment. As shown in the graph, the first-order gradients for layer parameters $h_1$ and $h_2$ are nearly equal, but the first-order gradient for $h_1$ is positive while the first-order gradient for $h_1$ is negative. When conventional techniques are used, the first-order gradients cancel each other out (i.e. sum to nearly zero). In contrast, when the first criterion is used that takes an absolute value of each product, the first-order gradients do not cancel each other out. $\mathbb{E}(h)$ is mathematical expectation of parameter h over a set of values in the training dataset. $C(D, \mathbb{E}(h))$ is a value of the cost function at location when h takes expectation value.

$$\propto \mathbb{E}\left(\left|\frac{\delta C}{\delta h} h\right|\right)$$

shows deviation of the of a product between a possible value of the parameter h and a first order gradient of the cost function with respect to the values of h.

In another embodiment, a second criterion may be used in place of the first criterion. The second criterion is computed by summing a square of the layer parameter scaled by the first-order gradient corresponding to the layer parameter over input channels and dimensions of a convolution kernel. More specifically, the second criterion is based on a layer input parameter $W_i \in \mathbb{R}^{M, X, Y}$ for parameter i, where M is the number of input channels for a feature map. X and Y are the convolution kernel dimensions. The second criterion, $\Theta_{SS}$ is a sum of squares:

$$\Theta_{SS} = \sum_{M=0}^{M-1} \sum_{X=0}^{X-1} \sum_{Y=0}^{Y-1} \left(\left(\frac{\delta C}{\delta W} \cdot W_{i,M,X,Y}\right)^2\right)$$

Like the first criterion, the second criterion is also computed based on a first-order gradient. The first-order gradient $$\frac{\delta C}{\delta W}$$

is a first derivative that is computed for each layer parameter during training and can be stored for use in the second criterion computation.

Figure 2B:
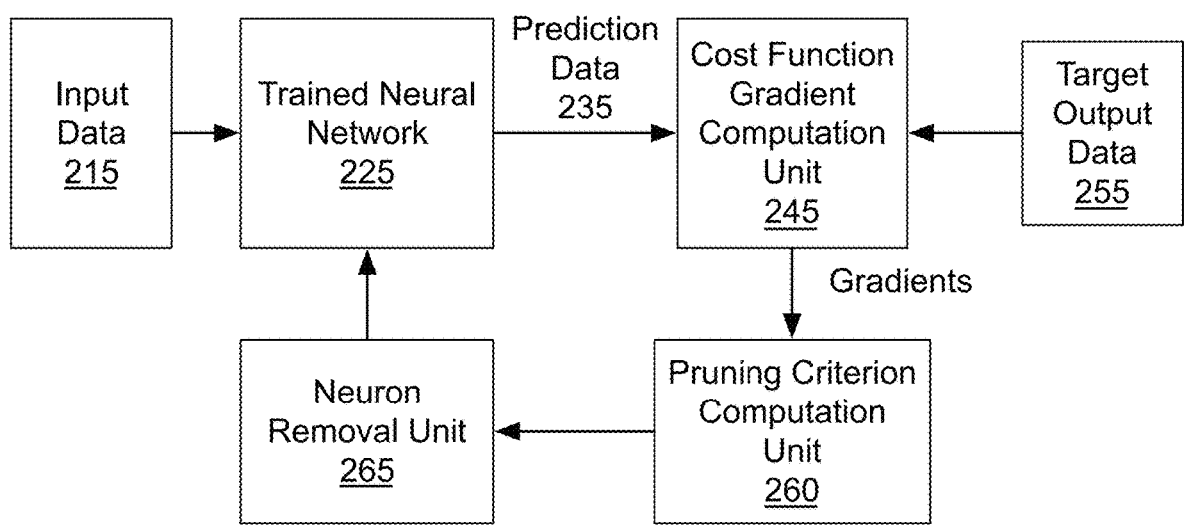
FIG. 2B illustrates a block diagram of a neural network pruning system, in accordance with one embodiment.

FIG. 2B illustrates a block diagram of a neural network pruning system 250, in accordance with one embodiment. The neural network pruning system 250 may be configured to perform the steps shown in FIG. 1A. The neural network pruning system 250 includes a trained neural network 225 and a training dataset that includes input data 215 and target output data 255 that should be generated by the trained neural network 225 when the input data 215 is applied. In one embodiment, the trained neural network 225 is a trained using a first dataset that is general before being trained using the training dataset that includes input data 215 and is specific. In one embodiment, the trained neural network 225 is a convolutional neural network.

During pruning, the trained neural network 225 processes the input data 215 and generates prediction data 135 (i.e., output data). A cost function gradient computation unit 245 receives the prediction data 235 and the target output data 255 and computes first-order gradients $\delta C/\delta h_i$ of cost values C relative to a layer input parameter $h_i$ produced from parameter i of the trained neural network 225. In one embodiment, during coarse pruning, the absolute value of the gradient is minimized for a layer parameter.

The first-order gradients are output to a pruning criterion computation unit 260 that computes a pruning criterion for each layer parameter of the trained neural network 125 based on the gradients. In one embodiment, the pruning criterion for a layer parameter, $\Theta_{TE}(h_i)$ is computed using the first criterion, as $$\left|\frac{\delta C}{\delta h_i} h_i\right|.$$

In another embodiment, the pruning criterion for a layer parameter, $\Theta_{SS}(W_i)$ is computed using the second criterion. The pruning criteria are represented as importance values that are provided to a neuron removal unit 265. The neuron removal unit 265 indicates to the trained neural network 225 that one or more neurons should be removed from the trained neural network 225.

Pruning of neurons may be implemented as a logic gate that disables output of some neurons. For example, a pruning gate $g_l^{(k)} \in \{0, 1\}^{C_l}$, may be a switch that determines if a particular feature map is included or pruned during feedforward propagation, such that when g is vectorized: W'=gW. In one embodiment, each pruning gate determines if the output of a particular neuron is used during feedforward propagation or not, such that the output of each neuron is:

$$z_l^{(k)} = c_l^{(k)} g_l^{(k)}$$

Figure 2C:
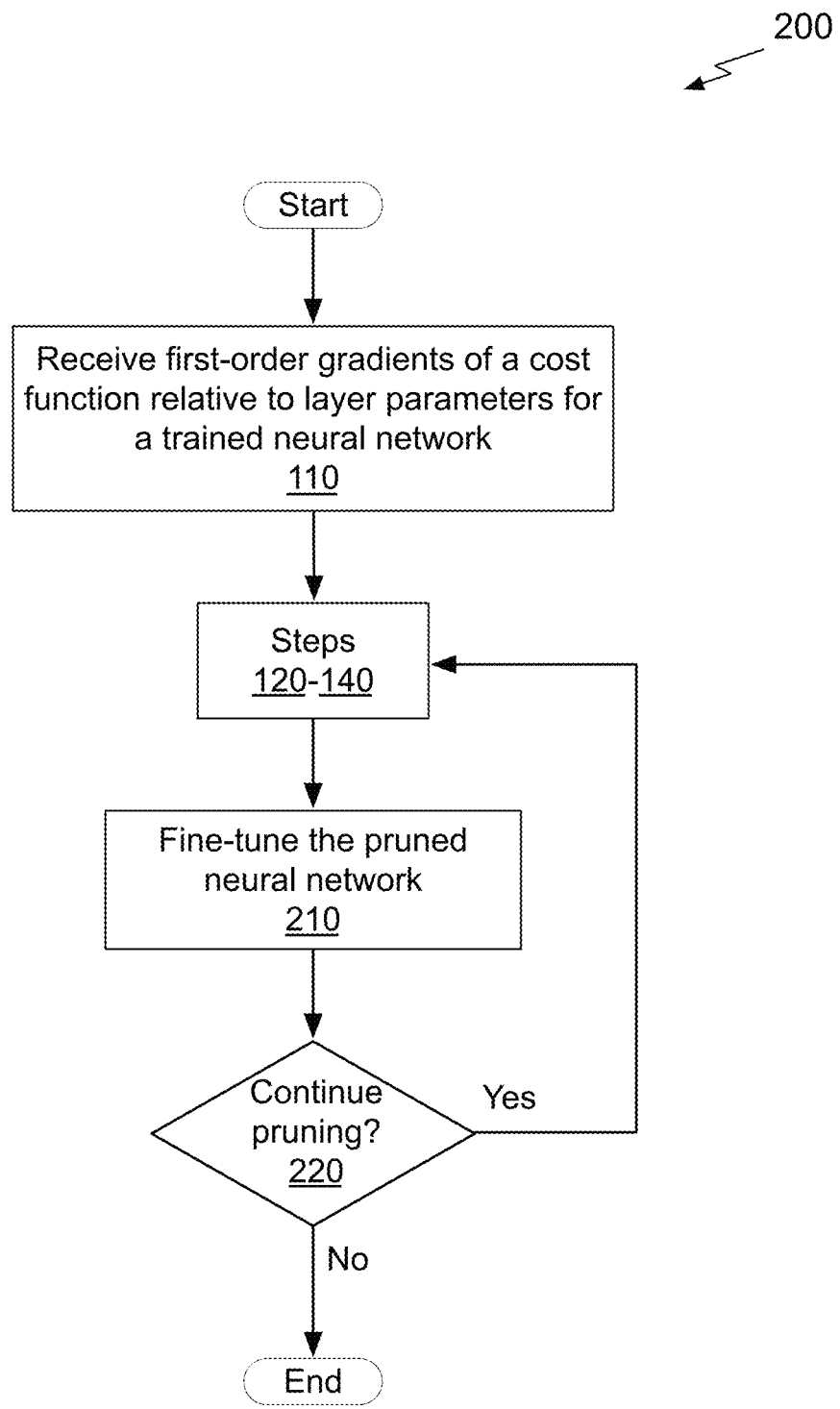
FIG. 2C illustrates a flowchart of another method for neural network pruning that includes the steps shown in FIG. 1A, in accordance with one embodiment.

FIG. 2C illustrates a flowchart 200 of another method for neural network pruning, in accordance with one embodiment. Although method 200 is described in the context of the neural network pruning system 250, the method 100 may also be performed by a program, custom circuitry, or by a combination of custom circuitry and a program. For example, the method 200 may be executed by a GPU, CPU, neural network, or any processor capable of implementing a neural network. Furthermore, persons of ordinary skill in the art will understand that any system that performs method 200 is within the scope and spirit of embodiments of the present invention.

The flowchart 200 includes steps 110, 120, 130, and 140 of FIG. 1A. At step 210, the pruned neural network is fine-tuned using conventional techniques. Fine-tuning involves optimizing parameters of the network to minimize a cost function on a given dataset. At step 220, a determination is made whether pruning should continue or not. If pruning will continue, the neural network pruning system 250 returns to step 120. Otherwise, pruning is complete. Pruning may be considered to be complete when a threshold number of neurons are removed. In one embodiment, neurons corresponding to a single feature map is pruned during each iteration, allowing fine-tuning and re-evaluation of the criterion to account for dependency between parameters. Once pruning is finished, parameters of neural network and pruning gates are fixed. Moreover, parameters that correspond to pruning gates with value zero can be removed from the neural network.

One of the main reasons to apply pruning is to reduce number of operations in the network. Feature maps from different layers require different amounts of computation due the number and sizes of input feature maps and convolution kernels. To take this into account floating-point operations per second (FLOPs) regularization is introduced:

$$\Theta(z_l^{(k)}) = \Theta(z_l^{(k)}) - \lambda \Theta_l^{flops},$$

where λ controls the amount of regularization. $\lambda = 10^{-3}$ may be used to compute $\Theta^{flops}$, assuming that convolution is implemented as a sliding window. In one embodiment, FLOPs regularization is applied during pruning to prune neurons with higher FLOPs first. For example, the FLOPs per convolutional neuron of each layer for an example neural network may be:

$$\Theta^{flops} = [3.1, 57.8, 14.1, 28.9, 7.0, 14.5, 14.5, 3.5, 7.2, 7.2, 1.8, 1.8, 1.8, 1.8]$$

Other regularization conditions may be applied, e.g. storage size, kernel sizes, or memory footprint, to prune neurons based on other conditions.

To compute the number of FLOPs, convolution is assumed to be implemented as a sliding window and that the nonlinearity function is computed for free. For convolutional kernels:

$$FLOPs = 2HW(C_{in}K^2 + 1)C_{out},$$

where H, W, and $C_{in}$ are height, width, and number of channels of the input feature map, respectively. K is the kernel width (assumed to be symmetric), and $C_{out}$ is the number of output channels.

For fully connected layers FLOPs is computed as:

$$FLOPs = (2I-1)O,$$

where I is the input dimensionality and O is the output dimensionality.

In sum, trained neural networks may be iteratively pruned using either a first criterion or a second criterion that are each computed based on a first-order gradient of the cost function w.r.t. the layer parameter $h_i$. The least important layer parameters are removed according to the first or second criterion. The FLOP regularization may be applied to compute importances and prune less important neurons with higher computation workloads. Similar to FLOPS, regularization of other resources (e.g., memory size, bandwidth, etc.) may be applied to compute importances based on other conditions.

Parallel Processing Architecture

Figure 3:
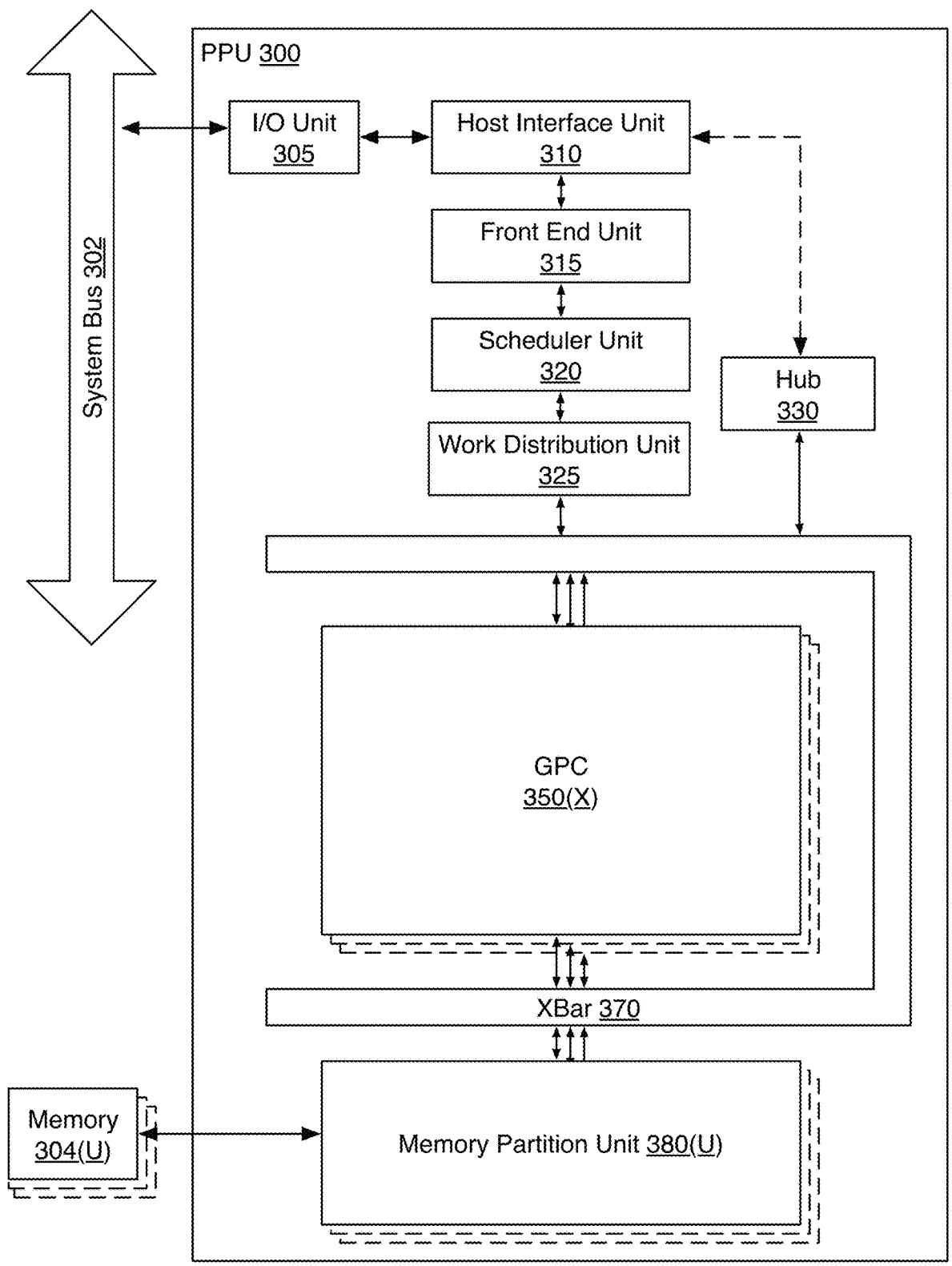
FIG. 3 illustrates a parallel processing unit, in accordance with one embodiment.

FIG. 3 illustrates a parallel processing unit (PPU) 300, in accordance with one embodiment. The PPU 300 may be configured to implement neural network pruning when instructions are executed. In one embodiment, the PPU 300 is configured to implement the neural network pruning system 250.

In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
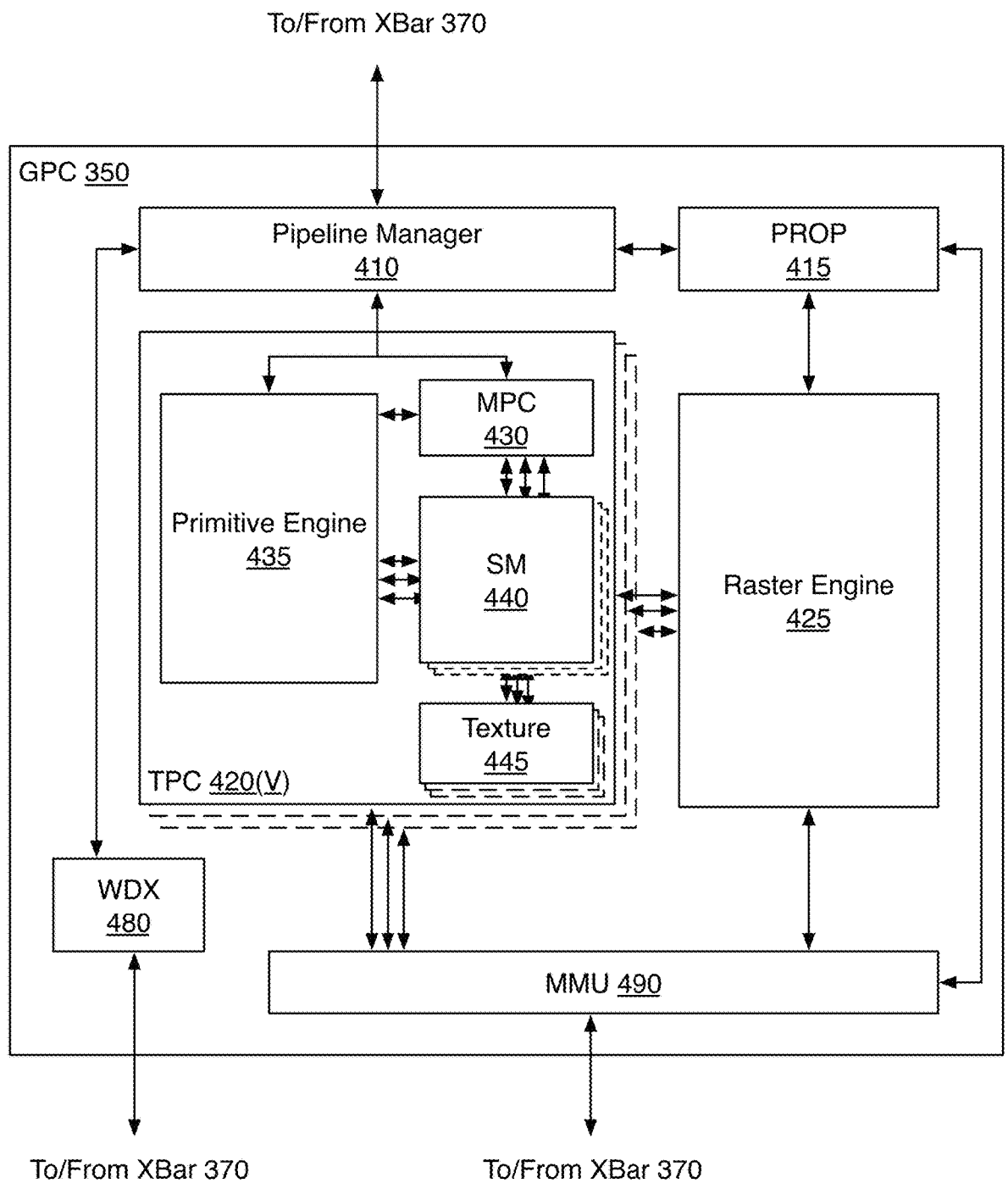
FIG. 4A illustrates a general processing cluster within the parallel processing unit of FIG. 3, in accordance with one embodiment.

FIG. 4A illustrates a GPC 350 within the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 is described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

Figure 4B:
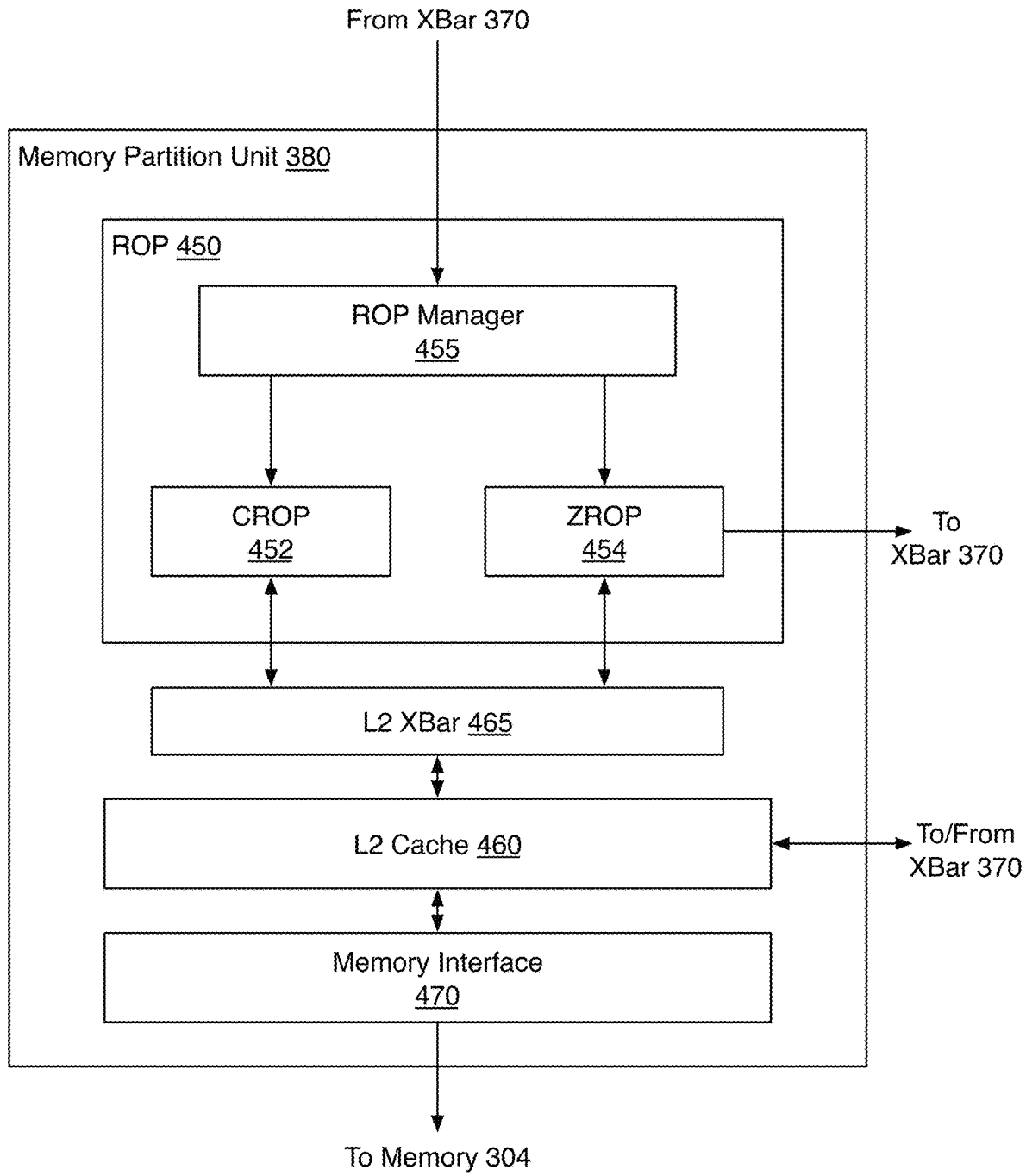
FIG. 4B illustrates a memory partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 incorporates U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
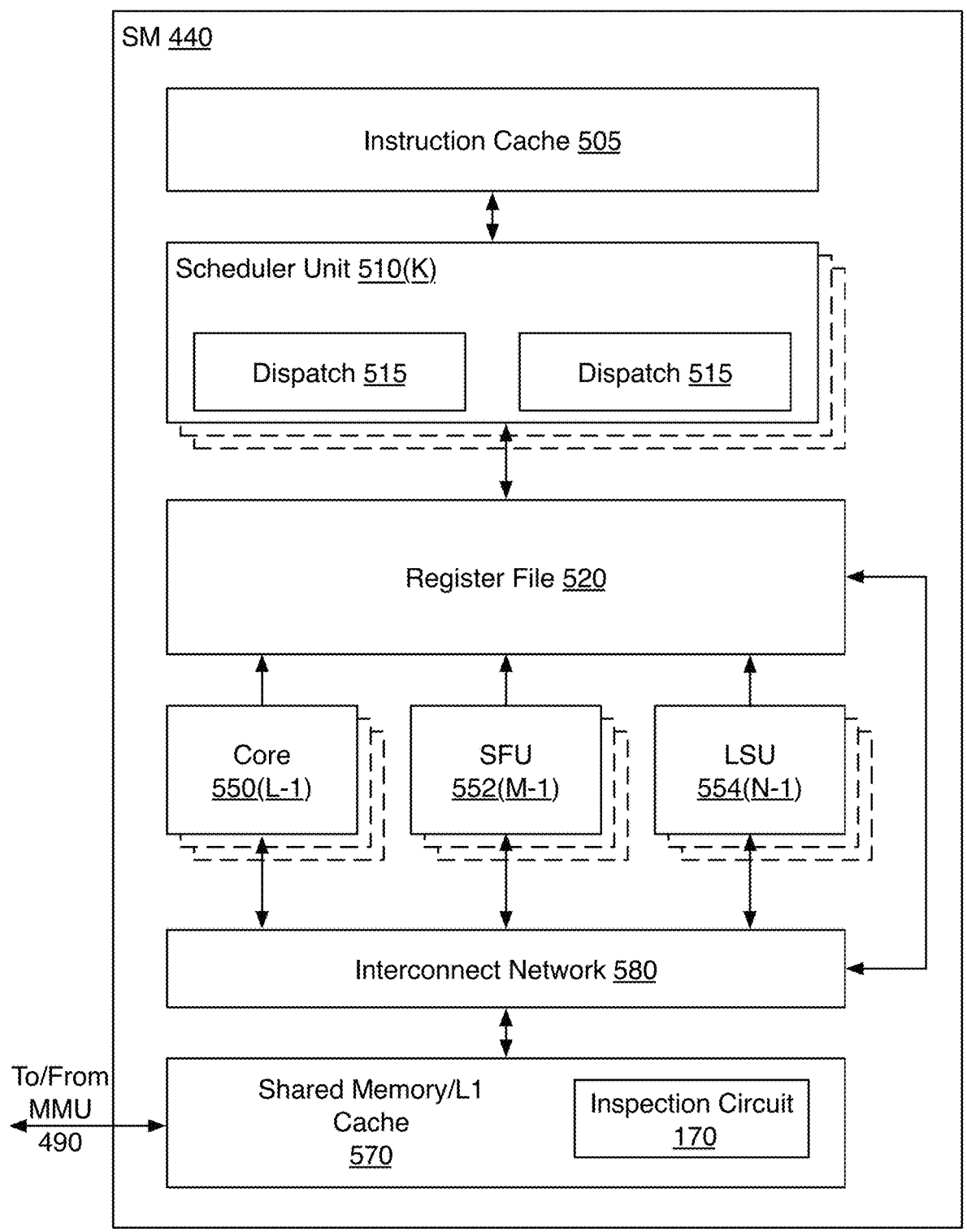
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570. In one embodiment, the instruction cache 105, the load/store unit 154, and the register file 115, shown in FIG. 1B is the instruction cache 505, the load/store unit (LSU) 554, and the register file 520, respectively.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes. In one embodiment, the shared memory/L1 cache 570 includes the inspection circuit 170 to perform inline data inspection for load operations. In one embodiment, at least one inspection circuit 170 is positioned between the shared memory/L1 cache 570 and the LSUs 554.

The PPU 300 described above may be configured to perform highly parallel computations much faster than conventional CPUs. Parallel computing has advantages in graphics processing, data compression, neural networks, deep learning, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write Global memory through partition shared memory/L1 cache 570 and partition unit 380. When configured for general purpose parallel computation, the SM 440 can also write commands that scheduler unit 320 can use to launch new work on the TPCs 420.

In one embodiment, the PPU 300 comprises a deep learning or machine learning processor. The PPU 300 is configured to receive commands that specify programs for modeling neural networks and processing data according to a neural network.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various layers of a neural network. For example, the device driver may launch a kernel on the PPU 300 to implement the neural network on one SM 440 (or multiple SMs 440). The device driver (or the initial kernel executed by the PPU 300) may also launch other kernels on the PPU 300 to perform other layers of the neural network. In addition, some of the layers of the neural network may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
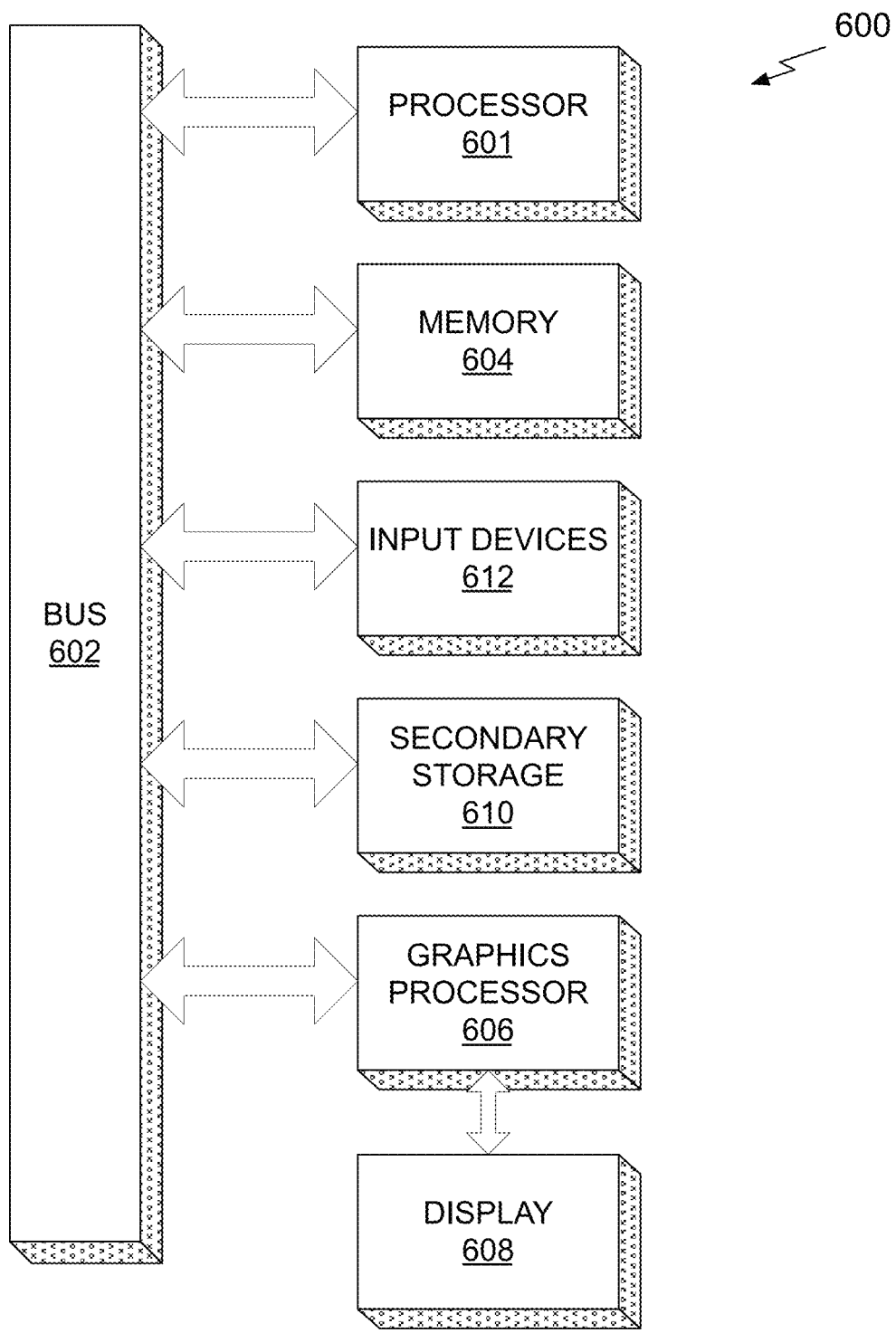
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be configured to implement neural network pruning.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). In one embodiment, the communication bus 602 is the system bus 302 shown in FIG. 3. The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of an autonomous vehicle, desktop computer, laptop computer, server, workstation, game console, embedded system, and/or any other type of logic. Still yet, the system 600 may take the form of various other devices including, but not limited to a personal digital assistant (PDA) device, a mobile phone device, head-mounted display, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A neural network pruning system, comprising:
a memory storing values of a layer parameter for a trained neural network,
wherein the layer parameter is an activation value or a weight;
a processor coupled to the memory and configured to:
receive first-order gradients of a cost function relative to the values of the layer parameter, wherein each value is associated with a neuron of a plurality of neurons included in the trained neural network;
compute a pruning criterion for each neuron in at least a portion of the plurality of neurons based on the first-order gradients, wherein the pruning criterion indicates a change in a value of the cost function when the neuron is removed from the trained neural network and is computed by summing a square of the value of the layer parameter scaled by the first-order gradient corresponding to the value over at least input channels;
identify at least one neuron in the portion that, according to the pruning criterion computed for the at least one neuron, indicates a lowest change compared with changes indicated by the pruning criteria computed for other neurons in the portion; and
remove the at least one neuron from the trained neural network to produce a pruned neural network.

2. The neural network pruning system of claim 1, wherein the trained neural network is a trained using a first dataset that is general before being trained using a second dataset that is specific.

3. The neural network pruning system of claim 2, wherein the first-order gradients are computed while the trained neural network is trained using the second dataset.

4. The neural network pruning system of claim 1, wherein computing the pruning criterion further comprises summing the square of the value of the layer parameter scaled by the first-order gradient corresponding to the value over dimensions of a convolution kernel.

5. The neural network pruning system of claim 1, wherein the processor is further configured to perform fine-tuning on the pruned neural network.

6. The neural network pruning system of claim 1, wherein the at least one neuron includes neurons in the portion having changes below a threshold value.

7. The neural network pruning system of claim 1, wherein the at least one neuron comprises a predetermined percentage of the plurality of neurons.

8. The neural network pruning system of claim 1, wherein the first-order gradients are computed during training of the trained neural network and stored in the memory.

9. A neural network pruning system,
comprising:
a memory storing values of a layer parameter for a trained neural network;
a processor coupled to the memory and configured to:
receive first-order gradients of a cost function relative to the values of the layer parameter, wherein each value is associated with a neuron of a plurality of neurons included in the trained neural network;
compute a pruning criterion for each neuron in at least a portion of the plurality of neurons based on the first-order gradients, wherein the pruning criterion indicates a change in a value of the cost function when the neuron is removed from the trained neural network and is computed as an absolute value of a product of the value of the layer parameter and the first-order gradient corresponding to the value;
identify at least one neuron in the portion that, according to the pruning criterion computed for the at least one neuron, indicates a lowest change compared with changes indicated by the pruning criteria computed for other neurons in the portion; and
remove the at least one neuron from the trained neural network to produce a pruned neural network.

10. The neural network pruning system of claim 9, wherein the layer parameter is an activation value.

11. The neural network pruning system of claim 9, wherein the layer parameter is a weight.

12. A computer-implemented method, comprising:
receiving first-order gradients of a cost function relative to values of a layer parameter for a trained neural network, wherein the layer parameter is an activation value or a weight that is associated with a neuron of a plurality of neurons included in the trained neural network;
computing a pruning criterion for each neuron in at least a portion of the plurality of neurons based on the first-order gradients, wherein the pruning criterion indicates a change in a value of the cost function when the neuron is removed from the trained neural network and is computed by summing a square of the value of the layer parameter scaled by the first-order gradient corresponding to the value over at least input channels;
identifying at least one neuron in the portion that, according to the pruning criterion computed for the at least one neuron, indicates a lowest change compared with changes indicated by the pruning criteria computed for other neurons in the portion; and
removing the at least one neuron from the trained neural network to produce a pruned neural network.

13. The computer-implemented method of claim 12, wherein the trained neural network is trained using a first dataset that is general before being trained using a second dataset that is specific.

14. The computer-implemented method of claim 13, wherein the first-order gradients are computed while the trained neural network is trained using the second dataset.

15. The computer-implemented method of claim 12, wherein the trained neural network is a convolutional neural network.

16. The computer-implemented method of claim 12, wherein computing the pruning criterion further comprises summing the square of the value of the layer parameter scaled by the first-order gradient corresponding to the value over dimensions of a convolution kernel.

17. A computer-implemented method,
comprising:
receiving first-order gradients of a cost function relative to values of a layer parameter for a trained neural network, wherein each value is associated with a neuron of a plurality of neurons included in the trained neural network;

computing a pruning criterion for each neuron in at least a portion of the plurality of neurons based on the first-order gradients, wherein the pruning criterion indicates a change in a value of the cost function when the neuron is removed from the trained neural network and is computed as an absolute value of a product of the value of the layer parameter and the first-order gradient corresponding to the value;

identifying at least one neuron in the portion that, according to the pruning criterion computed for the at least one neuron, indicates a lowest change compared with changes indicated by the pruning criteria computed for other neurons in the portion; and removing the at least one neuron from the trained neural network to produce a pruned neural network.

18. The computer-implemented method of claim 17, wherein the layer parameter is an activation.

19. The computer-implemented method of claim 17, wherein the layer parameter is a weight.

20. A non-transitory, computer-readable storage medium storing instructions that, when executed by a processor, cause the processor to perform steps comprising:

receiving first-order gradients of a cost function relative to values of a layer parameter for a trained neural network, wherein the layer parameter is an activation value or a weight that is associated with a neuron of a plurality of neurons included in the trained neural network;

computing a pruning criterion for each neuron in at least a portion of the plurality of neurons based on the first-order gradients, wherein the pruning criterion indicates a change in a value of the cost function when the neuron is removed from the trained neural network and is computed by summing a square of the value of the layer parameter scaled by the first-order gradient corresponding to the value over at least input channels;

identifying at least one neuron in the portion that, according to the pruning criterion computed for the at least one neuron, indicates a lowest change compared with changes indicated by the pruning criteria computed for other neurons in the portion; and removing the at least one neuron from the trained neural network to produce a pruned neural network.

21. A non-transitory, computer-readable storage medium storing instructions that, when executed by a processor, cause the processor to perform steps comprising:

receiving first-order gradients of a cost function relative to values of a layer parameter for a trained neural network, wherein each value is associated with a neuron of a plurality of neurons included in the trained neural network;

computing a pruning criterion for each neuron in at least a portion of the plurality of neurons based on the first-order gradients, wherein the pruning criterion indicates a change in a value of the cost function when the neuron is removed from the trained neural network and is computed as an absolute value of a product of the value of the layer parameter and the first-order gradient corresponding to the value;

identifying at least one neuron in the portion that, according to the pruning criterion computed for the at least one neuron, indicates a lowest change compared with changes indicated by the pruning criteria computed for other neurons in the portion; and removing the at least one neuron from the trained neural network to produce a pruned neural network.

* * * * *